No. 856,303. PATENTED JUNE 11, 1907.
G. ROTHENBUCHER.
PISTON ROD PACKING.
APPLICATION FILED JAN. 26, 1907.
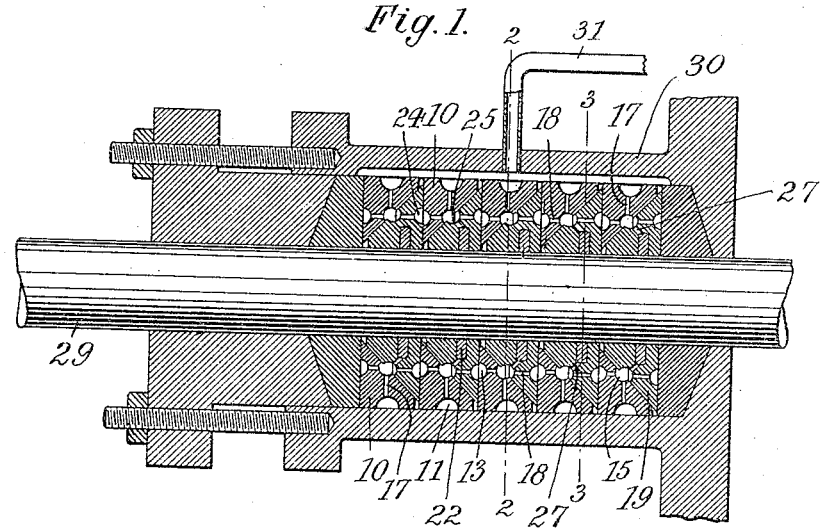
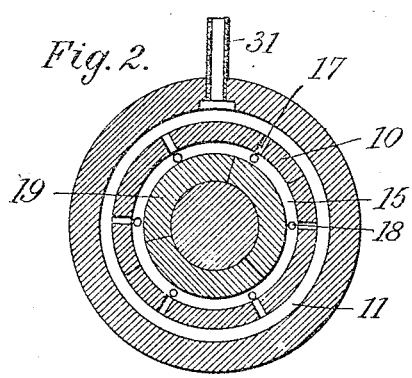
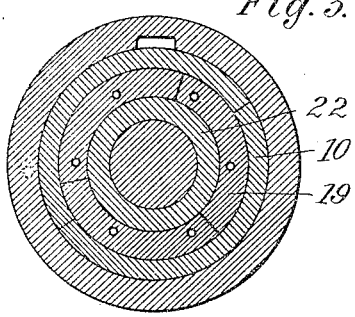
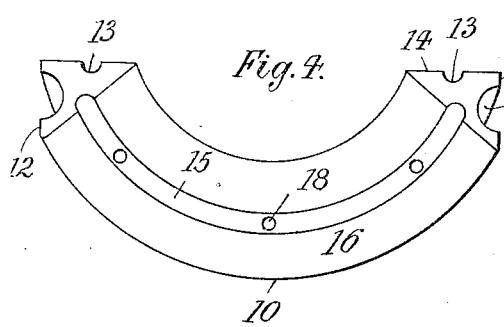
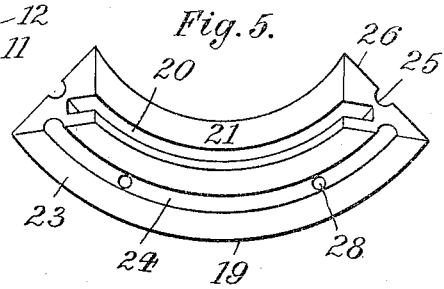
Witnesses:
Arthur E. Zumpe
Adolph Winer
Inventor
George Rothenbücher,
By his Attorney
Frank v. Briesen

UNITED STATES PATENT OFFICE.

GEORGE ROTHENBUCHER, OF NEW YORK, N. Y.

PISTON-ROD PACKING.

No. 856,303.    Specification of Letters Patent.    Patented June 11, 1907.

Application filed January 26, 1907. Serial No. 354,197.

*To all whom it may concern:*

Be it known that I, GEORGE ROTHEN-BUCHER, a citizen of the United States, residing at New York city, (Brooklyn,) county of Kings, State of New York, have invented new and useful Improvements in Piston-Rod Packing, of which the following is a specification.

This invention relates to a piston rod packing which provides means for effectively lubricating the piston rod and permits a uniform distribution of the lubricant along such rod and throughout the packing.

In the accompanying drawing: Figure 1 is a longitudinal central section of a stuffing box provided with my improved packing; Fig. 2 a cross section on line 2—2, Fig. 1; Fig. 3 a similar section on line 3—3, Fig. 1; Fig. 4 a perspective view of one of the outer ring-sections, and Fig. 5 a similar view of one of the inner ring-sections.

The packing comprises sets of overlapping outer and inner rings subdivided radially into a suitable number of sections, each of which has the form of a right angle triangle in cross section. Each outer ring-section 10 has a deep groove 11 in its circumference 12, such groove constituting an oil well. It also has a shallow groove 13 in that side 14 which joins circumference 12 at right angles. Lastly, it has a shallow groove 15 in its inclined side 16. Channel 11 communicates with groove 15 by radial ducts 17, while groove 15, in turn, communicates with groove 13 by ducts or other absorbent perforations 18, so that all three grooves communicate with each other.

Each inner ring-section 19 has a deep groove 20 in its inner face 21, such groove forming the seat for an asbestos ring or swab 22. The side 23 that adjoins side 21 at right angles, is provided with a shallow groove 24, and a further shallow groove 25 is formed in the inclined side 26. Groove 25 communicates with groove 20 by ducts or perforations 27, and also with groove 24 by ducts 28.

In assembling the parts, the rings are so arranged that each inner ring is placed with its inclined face against the corresponding face of the complementary outer ring. In this way the side 21 of the inner ring will face with its swab 22, the piston rod 29, while the side 12 of the outer ring will face with its oil well 11, the stuffing box 30. Further, the grooves 15, 25 of the inclined sides 16, 26, will be brought opposite one another to form, jointly, a circumferential channel between each mated pair of rings. As the rings are built up in sets, in the manner described, the straight side 14 of an outer ring will be made to face the straight side 23 of the inner ring of the adjoining set. Thus the grooves 13, 24 will also be brought opposite one another to form, jointly, a circumferential oil channel between adjoining sets of rings.

The lubricant introduced into the stuffing box by pipe 31 will enter the various wells 11, whence it will flow by ducts 17 into the channels formed by the grooves 15, 25 between the two rings of each set. From these channels the lubricant will flow through ducts 27 into the grooves 20, to saturate the swabs 22, and be transferred by the latter to the piston rod. The lubricant is also free to flow from the channels formed by the grooves 15, 25 of one ring-set, by ducts 18, 28 into the channel formed by the grooves 13, 24 of the adjoining ring-set.

It will be seen that with my packing the oil is effectively carried to the piston rod and will also distribute itself evenly throughout the packing. Thus, any excess of oil adhering to the rod will be returned or re-distributed. So also in upright stuffing boxes, any sediments will descend through the ducts 18, 28, and accumulate at the bottom of the box, from where they may be removed from time to time. Finally, the inner rings will have a tendency to slide inward upon their inclined faces, as the packing wears, so that the swabs will always hug the rod tightly.

I claim:

1. A piston rod packing comprising a ring having a groove in its inner face, an oil duct communicating with said groove, and an absorbent swab seated within the groove, substantially as specified.

2. A piston rod packing comprising an outer ring having a perforation, an inner ring having a communicating perforation and a groove into which its perforation opens, and an absorbent swab seated within said groove, substantially as specified.

3. In a piston rod packing, an outer ring-section substantially triangular in cross section and having a groove in each of its three sides, and ducts for connecting said grooves with each other, substantially as specified.

4. In a piston rod packing, an inner ring-section substantially triangular in cross section and having a groove in each of its three sides, and ducts for connecting said grooves with each other, substantially as specified.

5. A piston rod packing comprising an outer ring substantially triangular in cross section and having communicating grooves in each of its sides, an inner ring substantially triangular in cross section and having communicating grooves in each of its sides, which grooves also communicate with the grooves of the outer ring, and a swab fitted into one of the grooves of the inner ring, substantially as specified.

Signed by me at New York city, (Manhattan,) N. Y., this 25th day of January, 1907.

GEORGE ROTHENBUCHER.

Witnesses:
FRANK V. BRIESEN,
ADOLPH MINER.